UNITED STATES PATENT OFFICE 2,245,282

PROCESS FOR THE MANUFACTURE OF HYDROXYARYL-AMINOMETHYL KETONES

Helmut Legerlotz, Paris, France, assignor, by mesne assignments, to Ciba Pharmaceutical Products, Incorporated, Summit, N. J., a corporation of New Jersey No Drawing. Application January 24, 1940, Serial No. 315,444. In France September 14, 1938

2 Claims. (Cl. 260—570.5)

It is known that the best method for making secondary amino alcohols which have considerable technical importance consists in the reduction of the corresponding aminoketones. Accordingly aminoethanol compounds of the type $$HO.R.CHOH.CH_2.NH_2$$

wherein R is an aromatic residue are made by reducing the corresponding aminoketones, for instance oxyarylaminomethylketones of the formula $$HO.R.CO.CH_2.NH_2$$

Of compounds of this kind there is described in literature merely the ω-amino-para-oxyacetophenone (compare Mannich, Archiv d. Pharmacie 1915, page 192 ff. Also Ber. d. D. Chem. Ges., 44, 1542 ff.). The method of production described however is so complicated that it has not been considered as of technical value; on the other hand the ansisol serving as parent material is somewhat costly and considerably dearer than phenol from which, by the process of this present invention, the said compounds may be obtained; on the other hand the necessity for eliminating the methyl-group from the intermediate product para-methoxy-ω-aminoacetophenone requires a further working operation. It must be added that this separation of the methyl-group occurs only in an approximately quantitative degree and is attended by considerable loss of valuable organic material. Moreover Mannich (loc. cit. page 197) states that in the scission of paramethoxy-aminoacetophenone by means of hydrochloric acid of 38 per cent strength partial decomposition of the substance occurs and even in the case of the elimination of the methyl-group (pronounced by him to be considerably more advantageous) by means of hydriodic acid only a yield of about 50 per cent is obtained.

It follows that a method of making the aforesaid products directly from the cheap phenol compounds constitutes a considerable technical advance.

The invention is based on the observation that oxyaryl-aminomethylketones are obtained easily and in good yield by acylating oxyaryl-methylketones obtainable by methods in themselves known (compare f. i. Liebigs Ann. 464, page 293 and ff.; 460, page 88 and ff.), halogenating the product, adding to the acyloxyaryl-halogenmethylketone thus obtained hexamethylenetetramine in the presence of a solvent and then splitting in acid solution the addition compound thus obtained. Starting for example from ortho-cresol the synthesis may be represented by the following scheme:

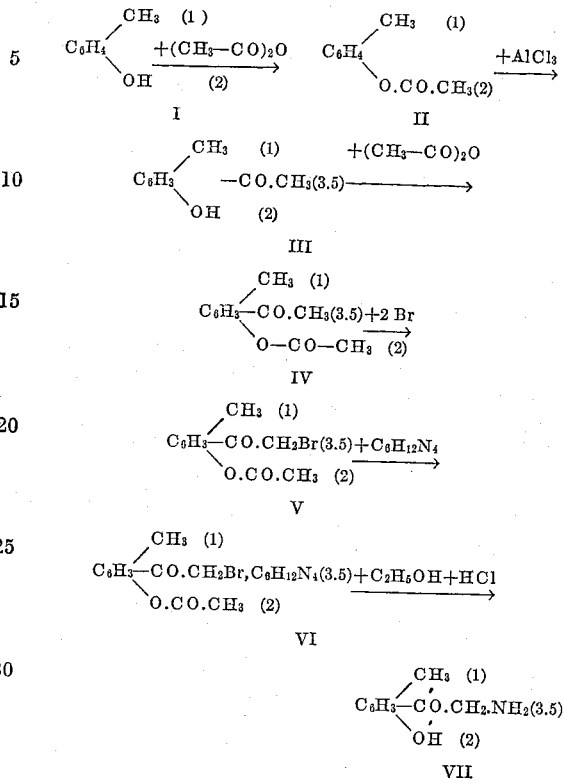

Since the acylated halogen ketones V are much more easily split by hydrogen halides than are the corresponding alkylated ketones, it was not to be expected that the first addition product VI would be formed and certainly not smoothly and with approximately quantitative yield. And the less so since in fact in certain cases no addition product is obtained with hexamethylenetetramine but merely in consequence of elimination of HBr hexamethylenetetramine hydrobromide identified by determination of the content of bromine and the melting point (198° C.) which shows no depression when determined for a mixture of the product with pure mono-hexamethylenetetramine hydrobromide. The reaction is the same in the case of ortho-bromaceto-para-benzoylcresol as well as of meta-bromacetoacetyl-phenol. In these cases however the hexamethylenetetramine is added to the corresponding iodine compound. This fact also is quite surprising as it would have been supposed that the iodine compounds which are known to be much more labile would have a greater tendency for elimination of hydrogen halide than the corresponding bromo ketones. Obviously the amino ketone VII may be also obtained by alkylating the oxyketone of Formula III. Only then in passing through the addition product VI to the amino ketone VII there is not necessary at the same time an opening of the phenol hydroxyl group, but rather a separate removal of the alkyl by usual methods. The same is the case when benzoyl is introduced into the parent material I instead of acetyl.

The final products are useful as intermediate products in making therapeutic materials.

The following examples illustrate the invention:

Example 1

75 grams of para-acetyl-ortho-cresol (melting point 104° C.) are dissolved in water with aid of 20 grams of caustic soda and to the solution are added gradually with vigorous stirring 85 grams of benzoyl chloride. When benzoylation is finished, as may be ascertained by adding the acid chloride and caustic soda solution to a sample of the solution which will no longer produce a precipitate (benzoyl product) when the reaction is complete, the product is filtered with suction, dried and recrystallized from hot benzene with addition of animal charcoal. Its melting point is 82–83° C.

50.8 grams of this product are dissolved in benzene and there is gradually introduced at ordinary temperature a benzene solution of 32 grams of bromine. After standing overnight in the ice chest the larger part of the bromo-ketone has separated; this is obtained quite pure by dissolving it in benzene and precipitating it by addition of petroleum ether. Its melting point is 122–124° C.

101.2 grams of the bromo-ketone are dissolved in chloroform and the solution is mixed with one of 42 grams hexamethylenetetramine in chloroform. After standing for 2 days the addition product has separated from the solution in nearly quantitative yield. It is well washed with alcohol, whereupon it melts at 165–167° C.

92.8 grams of this addition compound are thoroughly stirred at 35° C. for 30 hours with a mixture of 144 grams of aqueous hydrobromic acid of 48 per cent strength and 750 cc. of alcohol of 95 per cent strength. After cooling the whole is filtered with suction and the solid matter thoroughly washed with water to remove ammonium bromide. The dried solid is an almost pure benzoylated hydrobromide of the amino ketone with the position of the substituents 1:5:2 (compare VII in approximately theoretical yield. For the purpose of removing the benzoyl-group 60 grams of this material are heated with 300 grams of hydrobromic acid of 20 per cent strength at 100° C. for 6 hours while stirring. The crystalline mass which has been cooled and dried is repeatedly extracted by boiling with ether in a reflux apparatus to remove the benzoic acid formed by the saponification, then purified by dissolution in water, decolorizing the solution with animal charcoal and precipitating the hydrobromide of the ketone from the filtrate by addition of concentrated hydrobromic acid. The pure amino-ketone hydrobromide (1:2:5) (VII) melts at 232–233° C. For reduction it is converted in the usual manner by means of silver chloride into the corresponding hydrochloride which melts at 238–239° C.

Example 2

200 grams of para-acetyl-meta-cresol (melting point 128° C.) are boiled under reflux with 200 grams of acetic anhydride for 2 hours and after distilling the excess of anhydride the residue is fractionated in a vacuum. The acetyl-ketone of type IV distils at 151–152° under 12 mm. pressure. The pure product solidifies to a crystalline mass after a short time.

76.8 grams of this acetyl compound are brominated in carbon bisulfide solution with 64 grams of bromine. When the reaction is complete the solution is concentrated to about ⅓ of its original volume. For the rest the operation described in Example 1 may be followed. The crude product is recrystallized from carbon bisulfide and then melts at 120–122° C.

The production of the addition product with hexamethylenetetramine (melting point 160–161° C.) as well as its decomposition by means of alcoholic hydrobromic acid follow the described procedure. However in this case there is simultaneous elimination of the acetyl-group and the directly formed hydrobromide of the amino-ketone VII is to be found almost exclusively in the filtrate from the ammonium bromide from which it is obtained by evaporation in a vacuum. The hydrobromide (melting point 242–243° C.) purified by reprecipitation by hydrobromic acid is converted into the hydrochloride which in pure condition melts at 231–232° C.

Example 3

178 grams of meta-acetoxyacetophenone (obtainable by boiling meta-oxyacetophenone with acetic anhydride, boiling point 148–149° C. at 12 mm. pressure) are treated in carbon bisulfide with 160 grams of bromine in manner described in Example 2. The meta-acetoxy-bromacetophenone is obtained pure by recrystallization from a mixture of benzene and petroleum ether. It melts at 71–72° C.

257 grams of this bromketone are dissolved in acetone and there is added a concentrated solution of 150 grams of anhydrous sodium iodide in acetone. After standing for several hours the solution is filtered from sodium bromide and the filtrate evaporated to dryness in a vacuum. The residue which soon becomes crystalline is dissolved in tetrachlorethane and after filtration a solution of 140 grams of hexamethylenetetramine in tetrachlorethane is added to the filtrate. After standing for 2 days the addition product of the iodated ketone has separated in a yield of at least 90 per cent. It melts at 138–139° C.

444 grams of the addition product are stirred with a mixture of 1060 grams of hydriodic acid of 57 per cent strength and 3500 cc. of alcohol of 96 per cent strength for 25 hours at room temperature while a feeble current of hydrogen is passed through the liquid. The alcoholic filtrate from the deposited matter consisting chiefly of ammonium iodide is evaporated to about a quarter of its original volume, whereby the larger part of the hydriodide of the amino-ketone crystallizes; the rest is obtained by further evaporating the mother liquor. The crude hydriodide is rubbed with 4–5 times its weight of acetone several times for the purpose of separating the remaining ammonium iodide and the filtered acetone solution is evaporated to dryness in a vacuum. The residue is dissolved in a little water, filtered and mixed with concentrated hydriodic acid to precipitate meta-oxyphenyl-aminoacetophenonehydriodide. The pure product melts at 220–222° C. and the corresponding hydrochloride at 221–222° C.

By catalytic hydrogenation the latter takes up 2H to form the hydrochloride of meta-oxyphenyl-ethanolamine which when recrystallized from a mixture of alcohol and ether melts at 159–160° C.

What I claim is:

1. A process for the manufacture of hydroxyaryl-aminomethylketones, comprising acylating a hydroxyaryl-methylketone, halogenating the acylated derivative, adding hexamethylenetetramine to the acyloxyaryl-halogenmethylketone thus obtained in presence of an inert solvent for the reagents, and splitting the addition compound in acid solution.

2. A process for the manufacture of meta-hydroxyaryl - aminomethylketones, comprising acylating a meta-hydroxyaryl-methylketone, halogenating the acylated derivative, adding hexamethylenetetramine to the meta-acyloxyaryl-halogenmethylketone thus obtained in presence of an inert solvent for the reagents, and splitting the addition compound in acid solution.

HELMUT LEGERLOTZ.